US012774139B2

(12) United States Patent
Nguyen et al.

(10) Patent No.: US 12,774,139 B2
(45) Date of Patent: Oct. 27, 2026

(54) GRAPHENE OXIDE AS A BARRIER MATERIAL FOR FOOD PACKAGING

(71) Applicant: Northwestern University, Evanston, IL (US)

(72) Inventors: SonBinh T. Nguyen, Evanston, IL (US); Timothy Wei, Glenview, IL (US)

(73) Assignee: Northwestern University, Evanston, IL (US)

( * ) Notice: Subject to any disclaimer, the term of this patent is extended or adjusted under 35 U.S.C. 154(b) by 191 days.

(21) Appl. No.: 18/501,243

(22) Filed: Nov. 3, 2023

(65) Prior Publication Data

US 2024/0150097 A1 May 9, 2024

Related U.S. Application Data

(60) Provisional application No. 63/422,613, filed on Nov. 4, 2022.

(51) Int. Cl.

| | |
|---|---|
| ***B65D 65/42*** | (2006.01) |
| ***C01B 32/192*** | (2017.01) |
| ***C01B 32/198*** | (2017.01) |
| ***D21H 21/16*** | (2006.01) |
| ***D21H 21/52*** | (2006.01) |
| ***D21H 27/10*** | (2006.01) |

(52) U.S. Cl.

CPC ............ *B65D 65/42* (2013.01); *C01B 32/192* (2017.08); *C01B 32/198* (2017.08); *D21H 21/16* (2013.01); *D21H 21/52* (2013.01); *C01B 2204/04* (2013.01); *D21H 27/10* (2013.01)

(58) Field of Classification Search

CPC ......... B65D 65/00–65/466; D21H 1/00–27/42

See application file for complete search history.

(56) References Cited

U.S. PATENT DOCUMENTS

| | | | | |
|---|---|---|---|---|
| 2010/0128439 | A1 | 5/2010 | Tilak et al. | |
| 2010/0323177 | A1 | 12/2010 | Ruoff et al. | |
| 2011/0223405 | A1 | 9/2011 | Compton et al. | |
| 2011/0256376 | A1* | 10/2011 | Compton ............. | B01D 69/148<br>428/411.1 |
| 2014/0370246 | A1* | 12/2014 | Hurt ......................... | B05D 5/00<br>405/129.75 |

(Continued)

FOREIGN PATENT DOCUMENTS

| | | | |
|---|---|---|---|
| CN | 108004849 | A | 5/2018 |
| WO | WO 2021/229198 | A1 | 11/2021 |

(Continued)

OTHER PUBLICATIONS

Shin et al. (eds. Clark et al.). "Chapter 11: Food Packaging", Food Processing: Principles and Applications, 2nd ed., (2014); pp. 249-273.*

(Continued)

*Primary Examiner* — Prashant J Khatri

(74) *Attorney, Agent, or Firm* — Bell & Manning, LLC

(57) ABSTRACT

A food-packaging material is provided which comprises a paper substrate having a surface and a coating comprising exfoliated graphene oxide on the surface of the substrate, wherein the exfoliated graphene oxide is present at an amount of less than 1 wt %. Methods of making the food-packaging material and methods of using the food-packing material are also provided.

22 Claims, 10 Drawing Sheets

(56) References Cited

U.S. PATENT DOCUMENTS

| | | | | |
|---|---|---|---|---|
| 2016/0272575 | A1* | 9/2016 | Zheng | B32B 27/306 |
| 2017/0341054 | A1 | 11/2017 | Glover et al. | |
| 2018/0186954 | A1 | 7/2018 | Zheng et al. | |
| 2018/0327611 | A1 | 11/2018 | Scheffer et al. | |
| 2020/0109250 | A1 | 4/2020 | Hamidinejad et al. | |
| 2021/0246333 | A1 | 8/2021 | Rabnawaz et al. | |
| 2026/0125853 | A1 | 5/2026 | Nguyen et al. | |

FOREIGN PATENT DOCUMENTS

| | | | | |
|---|---|---|---|---|
| WO | WO 2022/136463 A1 | | 6/2022 | |
| WO | WO-2023104907 A1 | * | 6/2023 | D21H 19/828 |

OTHER PUBLICATIONS

Kwon et al. "The Effect of Thickness and Chemical Reduction of Graphene Oxide on Nanoscale Friction", The Journal of Physical Chemistry B, 122, (2018); pp. 543-547.*

"Joncryl(R) Emulsions for Corrugated Printing". BASF, (2013); pp. 1-5.*

"Graphene and PLA combined to create a new food-packaging film," *Italian Food Tech*, Dec. 19, 2016, pp. 1-4.

Gabrielle Holness, "Graphene Oxide in Food Packaging," *GOgraphene* Apr. 14, 2020, pp. 1-6.

Ana Barra et al., "Graphene Derivatives in Biopolymer-Based Composites for Food Packaging Applications," *Nanomaterials* 2020, 10, 2077; pp. 1-32. doi:10.3390/nano10102077.

Vinicius Rossa et al., "Nanocomposites based on the graphene family for food packaging: historical perspective, preparation methods, and properties," *RSC Adv.*, 2022, 14084.

Ashok Kumar Sundramoorthy et al., "Applications of graphene in quality assurance and safety of food," *Trends in Analytical Chemistry* 60 (2014) 36-53.

Maliheh Akhtari et al., "Effect of graphene oxide nanoparticle coatings on the strength of packaging paper and its barrier and antibacterial properties," *Bois et Forets des Tropiques*, 342: 69-78. Doi: https://doi.org/10.19182/bft2019.342.a31796.

Ajay Kathuria et al., "Sustainable and Repulpable Barrier Coatings for Fiber-Based Materials for Food Packaging: A Review," *Frontiers in Materials* Jul. 7, 2022, vol. 9, Article 929501, pp. 1-21. Doi: 10.3389/fmats.2022.929501.

Prasanta K. Raul et al., "Carbon Nanostructures As Antibacterials and Active Food-Packaging Materials: A Review," *ACS Omega* 2022, 7, 11555-11559.

Fenfen Li et al., "Enhancement of Gas Barrier Properties of Graphene Oxide/Poly (Lactic Acid) Films Using a Solvent-free Method," *Materials* 2020, 13, 3024; doi:10.3390/ma13133024.

Karoliina Helanto et al., "Bio-based Polymers for Sustainable Packaging and Biobarriers: A Critical Review," *BioResources* (2019), 14(2), 4902-4951.

Hongyi Qin et al., "A simple and economical method using graphene oxide for the fabrication of water/oil separation papers†," *RSC Adv.*, 2015, 5, 57860-57864.

The International Search Report and Written Opinion issued on Apr. 8, 2024 for international patent application No. PCT/US23/78591; pp. 1-11.

Araujo et al., "Tuning the surface chemistry of graphene flakes: new strategies for selective oxidation," *RSC Adv.*, Mar. 3, 2017, 7, 14290-14301. DOI: 10.1039/C6RA28868E.

The extended European Search Report mailed on Feb. 9, 2026 for European Patent Application No. 23887043.0; pp. 1-8.

* cited by examiner

Reduction

GRAPHENE OXIDE AS A BARRIER MATERIAL FOR FOOD PACKAGING

CROSS-REFERENCE TO RELATED APPLICATIONS

The present application claims priority to U.S. provisional patent application No. 63/422,613 that was filed Nov. 4, 2022, the entire contents of which are incorporated herein by reference.

BACKGROUND

Food-packaging materials are ubiquitous in the food industry. Nearly every type of food product is packaged so as to facilitate storage and shipment, preserve shelf-life, and ensure the quality and safety of the food product. Plastic and per- and polyfluoroalkyl substances (PFAS) are widely used as food-packaging materials because of their low cost and effectiveness in blocking the transport of water, grease, and gases through the packaging material.

SUMMARY

Provided are food-packaging materials comprising graphene oxide (GO) or a derivative thereof. The food-packaging materials are described in greater detail in the Detailed Description and Examples, below.

In embodiments, a food-packaging material comprises a paper substrate having a surface and a coating comprising exfoliated graphene oxide on the surface of the substrate, wherein the exfoliated graphene oxide is present at an amount of less than 1 wt %.

In embodiments, a method of making the food-packaging material disclosed above comprises exposing the paper substrate to an aqueous solution comprising the exfoliated graphene oxide to deposit the exfoliated graphene oxide on the surface of the substrate and form the coating.

In embodiments, a method of reducing absorption and/or transmission of water, oil/grease, water vapor, or combinations thereof, from a food product into, or through, a paper substrate comprises contacting the food-packaging material comprising the paper substrate and the coating thereon as disclosed above, with a food product comprising water, oil/grease, water vapor, or combinations thereof, wherein a reduced amount of water, oil/grease, water vapor, or combinations thereof, is absorbed and/or transmitted through the food-packaging material as compared to the paper substrate without the coating thereon.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Provided are food-packaging materials comprising a substrate and graphene oxide (GO) on a surface of the substrate. As further described below, the GO renders the substrate surprisingly resistant to a variety of different chemical substances, including those originating from food products packaged in the food-packaging material.

Figure 7A:
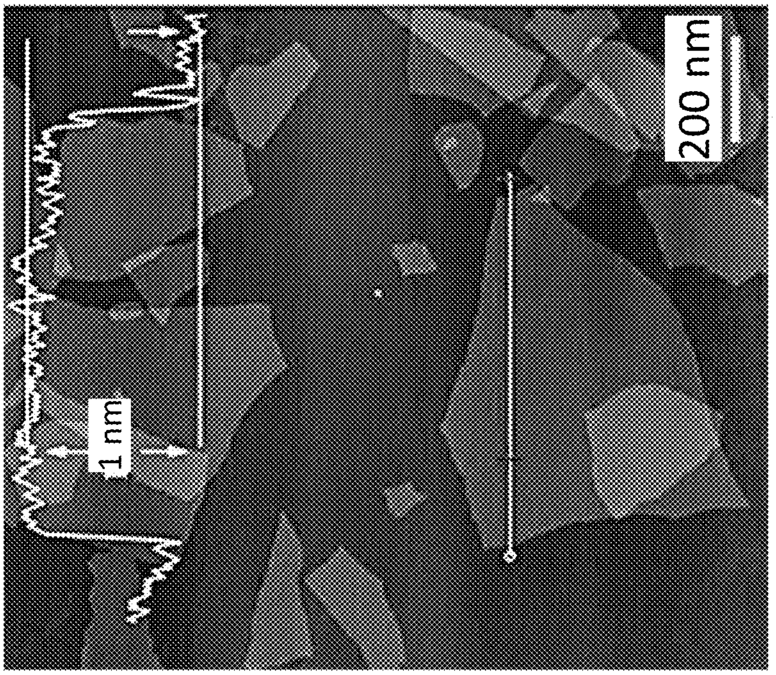
FIG. 7A: Tapping-mode atomic-force microscope (AFM) image of exfoliated GO sheets deposited on a fleshly cleaved mica substrate. (Image is reproduced from Yang, Y., et al. *J. Mater. Chem.* 2012, 22, 23194-23200.)
Figure 7B:
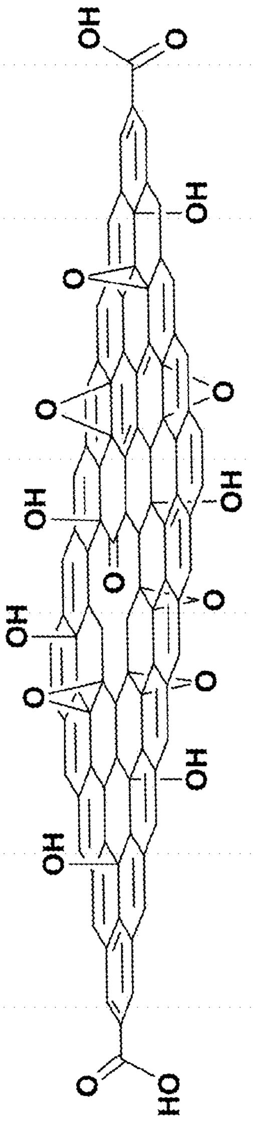
FIG. 7B, 7C: Molecular structural model of GO and reduced GO (rGO).

The GO on the substrate surface may be in the form of a plurality of thin, flexible sheets. Each GO sheet may comprise from one to a few (e.g., 1-2, 2-3, 3-5) monolayers of GO. Thus, the thickness of a sheet may be less than less than 3 nm, less than 2 nm, or in the range of from a monolayer (~7 Å) to about 1 nm. The lateral dimensions of a GO sheet may be significantly greater, on the order of microns, e.g., 1 μm, 10 μm, 50 μm, or 100 μm, providing an aspect ratio of at least >100. The two-dimensional, sheet morphology of the GO on the substrate surface is by contrast to particles, e.g., nanoparticles. The phrase “exfoliated GO” may be used to characterize the GO on the substrate surface, by which it is meant that the GO has been subjected to exfoliation to provide the individual sheets. An AFM image of an exfoliated ~1 nm GO sheet composed of a monolayer of GO is shown in FIG. 7A. FIG. 7B is an illustration of the chemical structure of a monolayer of GO.

Figure 7C:
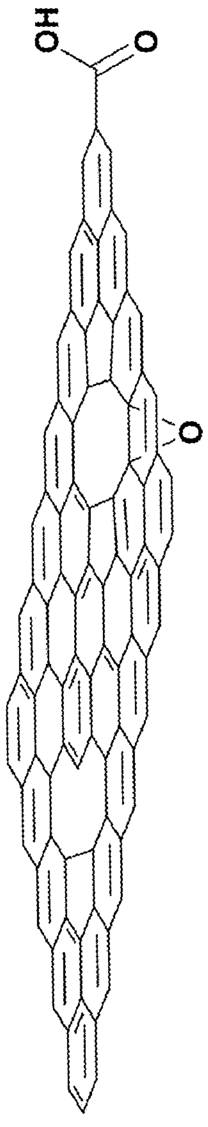

As shown in FIG. 7B, the GO on the substrate surface comprises a plurality of oxygen-containing functionalities. However, the methods for forming the present food-packaging materials may comprise reducing (e.g., by heating) at least some of these oxygen-containing functionalities, thereby converting at least some of the GO on the substrate surface to reduced graphene oxide (rGO). This is illustrated in FIG. 7C. Thus, the rGO sheet shown in FIG. 7C is a GO derivative. The extent of the reduction as well as the relative amount of GO and rGO on the substrate surface, may be adjusted as desired. Thus, the food-packaging material may comprise GO, rGO, or both GO and rGO. In embodiments, only GO is present (substantially no rGO is present). The phrase "substantially no rGO" does not require that the amount of rGO or the extent of reduction be perfectly zero, but rather that the GO has not be subjected to a reduction technique (e.g., heating). In other embodiments, both GO and rGO are present.

The extent of reduction of the GO on the substrate surface or the relative amount of GO and rGO on the substrate surface may be quantified by reference to a measured carbon-to-oxygen (C/O) ratio. Lower C/O ratios indicate less (or no) reduction and less (or no) rGO while higher C/O ratios indicate more reduction and more rGO. A C/O ratio in the 1.1-2 range may be used to indicate substantially no reduction or substantially no rGO. In embodiments, a C/O ratio of from 1 to 5 may be used. This includes a C/O ratio of 1.1, 1.5, 1.8, 2, 2.5, 3, 3.5, 4, 4.5 and 5.

Various amounts of GO may be used as desired. However, in embodiments, the amount of GO on the substrate surface is less than 0.05 weight (wt) %. This includes less than 0.025 wt %, less than 0.0125 wt %, less than 0.005 wt %, less than 0.0025 wt %, from 0.00025 wt % to 0.0125 wt %, from 0.00025 wt % to 0.005 wt %, from 0.0125 wt % to 0.05 wt %, from 0.0125 wt % to 0.1 wt %, and from 0.025 wt % to 0.05 wt %. These wt % amounts refer to the amount of GO by weight of the paper substrate. If both GO and rGO are used, these amounts may refer to the combined amount of GO and rGO. As demonstrated in the Examples below, it has been found that even at such small amounts of GO, the present food-packaging materials are highly resistant to water, oil/grease (e.g., food oils such as olive oil and canola oil; food fats such as triglycerides), and gases (e.g., water vapor, oxygen, carbon dioxide, etc.). Such chemical substances typically originate from food products being packaged in the food-packaging material.

The GO (and rGO, if present) on the substrate surface may be referred to as a "coating," a "GO coating," and similar terms. However, as the amounts of GO on the substrate surface are generally very small (see above), such coatings are in the form of the individual, discrete GO sheets (including monolayer sheets) dispersed across the substrate surface akin to a "patchwork quilt" of GO on the substrate surface, i.e., as opposed to a continuous layer of connected or overlapping GO sheets. As noted above and demonstrated in the Examples, below, such coatings only minimally increase the weight or thickness of the underlying substrate, but are able to render the underlying substrates surprisingly resistant to a variety of chemical compounds.

Various substrates may be used as desired, provided the substrate is one configured to contact, encapsulate, surround, contain, deliver, etc. a food product. The term "food product" encompasses any type of product to be orally digested by a mammal, e.g., a human. This includes both solids and liquids, e.g., beverages. Illustrative food products include beverages, French fries, hamburgers, frozen foods, fried foods, baked foods, etc. Thus "food-packaging material" encompasses "food- and beverage-packaging materials". The morphology of the substrate is not particularly limited, but rather, is dictated by the food product being packaged. Illustrative morphologies include containers, wrappers, plates, bowls, utensils, straws, cups, etc.

Paper substrates may be used. Paper substrates may be characterized as being in the form of a porous network of cellulose fibers. Suitable paper substrates include those produced by a variety of mechanical and chemical processing techniques and derived from a variety of cellulose sources. Thus, the paper substrates may include any fillers (e.g., clay, inorganic salts, etc.) and additives normally used in such paper-making techniques. Illustrative paper substrates include those provided by paper bags (e.g., brown grocery bags) and paperboard.

In embodiments, the paper substrate is uncoated (this does not preclude the presence of the GO/rGO as described herein). This means that the paper substrate does not have any base coating applied to the surface of the paper substrate onto which the GO (and rGO, if present) is applied. When such uncoated paper substrates are used, the GO is generally adhered to, including covalently bound to, individual cellulose fibers of the paper substrate. This is as opposed to the GO being present within or filling pores defined by those individual cellulose fibers. Thus, surprisingly, the barrier properties (i.e., chemical resistance) exhibited by the present food-packaging materials are not due to the blockage of pores in the paper substrates by GO. The covalent bonding may be due to dehydration reactions or through ring-opening of the GO epoxy groups by the hydroxyl groups present on the cellulose fibers. This covalent bonding may occur only on the surface of the GO in contact with the cellulose fibers; other oxygen-containing functionalities as described above may still be present on the opposing surface of the GO not in contact with the cellulose fibers. However, if subjected to reduction, the amount of such oxygen-containing functionalities may be reduced on the opposing surface. Depending upon the extent of the reduction, rGO may also be covalently bound to the cellulose fibers in an analogous fashion.

In other embodiments, the paper substrate comprises a base coating on a surface onto which the GO (and rGO, if present) is applied. The base coating may comprise or consist of a base coating polymer, which may be a water-soluble polymer, e.g., styrene-acrylate copolymers, propylene oxide-ethylene oxide copolymers, poly(lactic acid), poly (hydroxyalkanoates), starch, chitosan, polysaccharides, etc. If a base coating is present, the GO (and the rGO, if present) may be covalently bound as described above to the base coating polymer, cellulose fibers of the paper substrate, or both.

In other embodiments, the paper substrate may be uncoated or may comprise a base coating, and the GO (and the rGO, if present) is combined with an additive, which may be any of the base coating polymers, e.g., a styrene-acrylate copolymer, as described above. As demonstrated in the Examples below, the combination of GO with such additives results in improved barrier properties, even as compared to the use of GO alone on a paper substrate comprising a base coating with the same styrene-acrylate copolymer. (See FIG. 5, which is further described in Example 3, below.) In embodiments in which the GO is combined with an additive, the relative amounts may be adjusted as desired. In embodiments, however, the GO:additive weight ratio is in a range of from 0.0001 to 0.01. This includes from 0.0005 to 0.01 and from 0.001 to 0.01.

The GO (and the rGO, if present) may be the only material on the substrate surface or in the GO coating, i.e., no other components such as starch, polymer(s) (including the additives described above), antimicrobial agents, etc., are required. Thus, in embodiments, the food-packaging materials may be free of such other components. However, in other embodiments, such other components may be used, e.g., when the GO is combined with an additive as described above.

In embodiments, the food-packaging material comprises or consists of a paper substrate having a surface and a coating comprising or consisting of GO, and optionally, an additive, on the surface. The GO may be exfoliated GO in the form of a plurality of sheets, including monolayer sheets. The GO may be GO only or a combination of GO and rGO (this encompasses GO having a certain extent of reduction or a certain C/O ratio as described above). Any of the additives described herein may be used. The GO may be present in the coating at any of the amounts described herein. Any of the paper substrates described herein may be used.

As noted above, the present food-packaging materials are remarkably resistant to a variety of chemical substances. This includes exhibiting resistance to water, oil/grease, and water vapor. The term "resistance" refers to the food-packaging material reducing and/or preventing the absorption and/or transmission of particular chemical substance(s) into or through the food-packaging material. These resistances may be quantified using the techniques described in the Examples below. The ability of a material to simultaneously resist disparate chemical substances, e.g., water and oil/grease, is surprising as typically, if a material resists water, it attracts oil and vice versa. (See FIG. 5 which demonstrates the water resistance of a paper bag (otherwise uncoated) treated with a mixture containing 0.1 wt % GO, 25 wt % of a WBBC solution comprising a styrene-acrylate copolymer, and water ('x' symbols). FIG. 6 demonstrates the oil-resistance of the similarly treated paper bag ('x' symbols).)

Methods of forming the food-packaging materials are also provided. Such a method may comprise exposing any of the disclosed substrates to an aqueous solution comprising or consisting of GO (and rGO, if present) under conditions to deposit the GO on the surface of the substrate. Other components (e.g., any of the additives described above) may be included in the aqueous solution as desired, but such other components are not required. The exposure may be carried out using a variety of techniques, e.g., brushing, roll coating, spraying, immersion, dipping, Langmuir-Blodgett (LB) deposition, Langmuir-Shaefer (LS) deposition, inkjet printing, etc. After the exposure step, drying in air at room temperature (20 to 25° C.) or in the presence of heat or both may be used, which removes adsorbed water. Heat treatment may also convert at least some of the GO to rGO as described above. The conditions of the heat treatment (e.g., temperature and time) may be adjusted to achieve a desired amount of GO reduction to rGO. In certain embodiments, however, no heat treatment is used so that substantially no rGO is present. When heat treatment is used, in embodiments, the temperature is in a range of from 75 to 125° C., from 85 to 115° C., or from 90 to 100° C. The time may be in a range of from a few seconds to a few minutes, e.g., 1 sec to 1 minute, 1 minute to 30 minutes, from 1 minute to 20 minutes, or from 5 minutes to 15 minutes.

Also provided by the present disclosure is a method of reducing and/or preventing absorption and/or transmission of a chemical substance (e.g., water, oil/grease, water vapor or combinations thereof) by contacting any of the disclosed food-packaging materials with a food product. As discussed above, these types of chemical substances may be present in, or originate from, the food product being packaged by the food-packaging material. The resistance of the present food-packaging materials to such chemical substances reduces and/or prevents absorption and/or transmission of such chemical substances into/through the food-packaging material, e.g., as compared to the substrate of the food-packaging material without the GO (or the rGO) thereon.

Also provided by the present disclosure is a packaged food product comprising a food product in contact with any of the disclosed food-packaging materials.

EXAMPLES

Example 1

Introduction

A series of experiments were conducted that demonstrate the efficacy of using very small amounts of graphene oxide (GO) to enhance the barrier properties of paper. The results demonstrate the use of GO-coated paper as a low-cost, sustainable food-packaging material. Notably, the paper substrates used were commercially produced paper (as opposed to cellulose papers, which do not contain many additives). The direct-coating process described below is a topical fabrication strategy that can be deployed onto existing surfaces of commercially available papers post manufacturing. This is by contrast to the coating of individual fibers of cellulose papers prior to, and as part of, fiber network formation. The GO coatings below can be applied at very small amounts of GO while still achieving the desired barrier properties. Finally, without wishing to be bound to any particular theory, the improved barrier properties are believed to arise from superhydrophobic and superoleophobic nanoscale structures formed by GO nanosheets upon being deposited onto the paper fibers. It is surprising that the resulting GO coatings exhibit both hydrophobicity (resistance to water) and oleophobicity (resistance to oil) at the same time.

Experimental

Small quantities of aqueous dispersions of GO were applied to a range of paper substrates including paper towels, standard copier paper, index cards, and untreated paperboard (i.e., commercial-grade, heavy-weight paper that did not have any other coatings applied).

The source material for the GO coatings was a GO dispersion, a 1 wt % aqueous solution of GO. The GO solution was applied to one side of the substrates by either brushing with a brush, spreading with a palette knife, or using a drawdown rod coater to a concentration of 7-10 $g/m^2$. This is estimated to correspond to a maximum GO concentration on the paper substrate of ~200 ppm of GO by weight. It is noted that the GO-coating strategy does not require premixing of GO with cellulose fiber prior to paper formation. Thus, it advantageously allows for application to a broad range of commercially available paper stocks, including those which may comprise many additives such as clay and inorganic salts. It also advantageously allows for very low GO loading values.

GO-coated samples were either air-dried or heated in an oven over a 160-200° C. temperature range for a few minutes (i.e., ~1-5 min) or until there was a change in color (indicating the deoxygenation of the GO and formation of rGO).

Results

Water drops were applied to samples of paper towel (both control samples without GO coatings and samples with GO coatings). Little to no effect was observed in terms of liquid barrier properties for either sets of samples, likely due to the low density and highly porous fiber structure of these types of paper substrates.

3"×5" index card samples (both control samples without GO coatings and samples with GO coatings) were folded into small 'boats' (~2.5 cm×7.6 cm×2.5 cm, with the treated side in for the GO-coated sample) and filled with water that has been dyed with food color for visualization. After 16 h, the dyed water had significantly penetrated the control sample and reduced its strength. Within hours, staining of the paper substrate due to absorption of the dyed water was evident. By contrast, the GO-treated sample showed no evidence of water absorption into the paper substrate, demonstrating the resistance of the GO coating to water.

A small aliquot of the GO aqueous dispersion was applied to the middle region of a sheet of standard copier paper with a palette knife and the whole sheet was "baked" at 200° C. for 30 minutes in a home oven. After this "baking", the whole sheet of copier paper turned brown but the GO-treated region could still be distinguished by its darker shading and the brown ring caused by the diffusion of water when the GO dispersion was initially applied. Drops of canola oil were applied to the GO-treated region first and then another drop was applied to the untreated part of the paper several seconds afterward. The oil drops in the treated region pooled over, demonstrating that the treated region was resistant to oil absorption. In contrast, the oil drop in the untreated region was absorbed and spread through the whole paper immediately after it was applied.

Example 2

Introduction

Additional experiments were conducted that demonstrate the efficacy of using very small amounts of GO to enhance the barrier properties of paper.

Experimental

Small quantities of aqueous dispersions of GO were applied to two different types of commercially available paper drinking straws (black-striped straw and long white straw) to compare their water absorption against untreated control straws.

To form the GO coatings, straws were immersed in a 0.2 wt % aqueous GO solution. The time of immersion was less than 5 sec.

For each straw type, one straw was treated with the GO solution and one straw was untreated. This resulted in a total of four straws. Afterward, all straws were heated in an oven at 160° C. for 25 min before being removed and allowed to air-cool.

Straws were weighed using an electronic balance with a ±0.01 g resolution.

For testing, each straw was immersed in water for 30 min. During that 30 min period, they were removed every 5 min, gently shaken to removed excess water, weighed, and then put back in the water. The weights of the straws were recorded and plotted as a function of time.

Results

Figure 1:
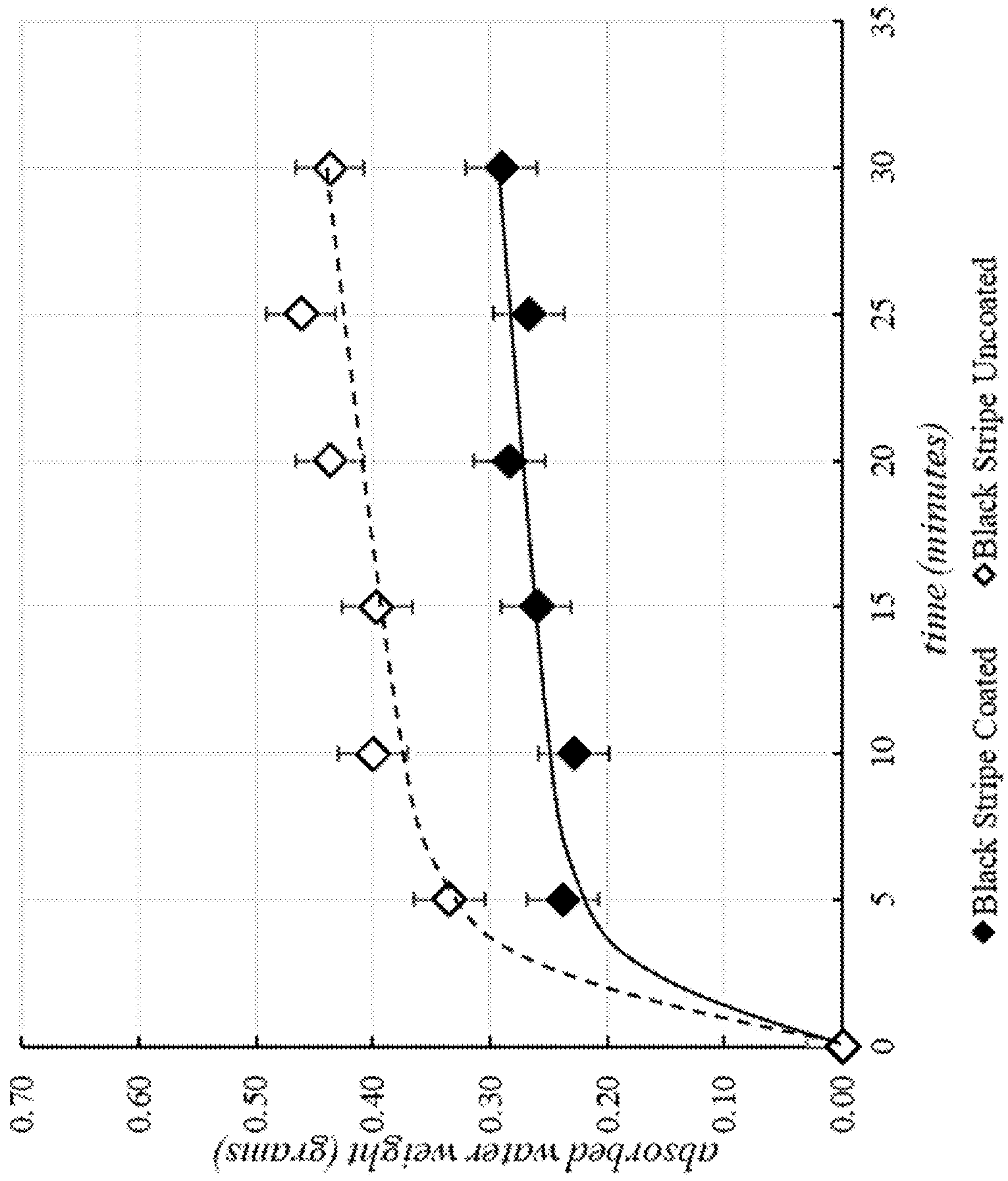
FIG. 1 is a plot of water absorption as a function of time of an uncoated black-striped straw and a graphene oxide (GO)-coated, black-striped straw. The reduced water absorption of the GO-coated black-striped straw demonstrates its increased hydrophobicity.
Figure 2:
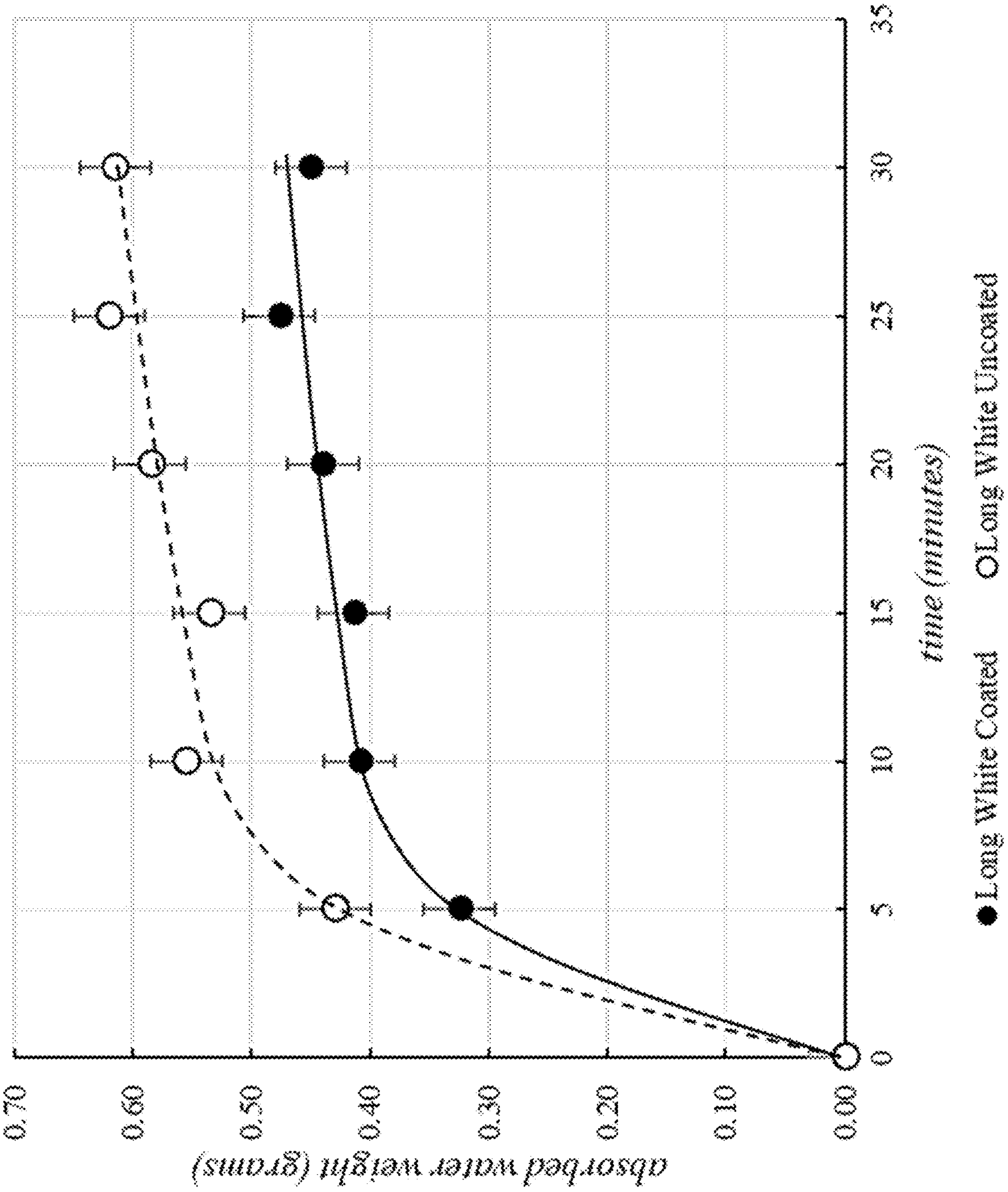
FIG. 2 is a plot of water absorption as a function of time of an uncoated long white straw and a GO-coated, long white straw. The reduced water absorption of the GO-coated long white straw demonstrates its increased hydrophobicity.

FIG. 1 is a plot of the amount of water absorbed on GO-treated and untreated black striped straws as a function of time. FIG. 2 is a plot of the amount of water absorbed on GO-treated and untreated white straws as a function of time. In each plot, the abscissa is time measured in minutes and the ordinate is weight of the water absorbed, i.e., the weight of the straw at time, t, minus the weight of the straw after heat treatment but prior to immersion in water. Untreated straw data are plotted using open symbols and GO-treated straw data are plotted with solid symbols. A completely hydrophobic straw would not absorb any water.

The results of the testing showed that the weights of the GO-treated straws (after heat treatment but prior to immersion in water) were statistically indistinguishable from the weight of their untreated counterparts. For both types of straws, even the very small amounts of GO used were sufficient to reduce the amount of water absorbed by the straws. These results further demonstrate the resistance of the GO coatings to water.

Example 3

Introduction

Graphene oxide (GO) is typically synthesized by reacting graphite powders with strong oxidizing agents in concentrated sulfuric acid. Graphite oxidation breaks up extended two-dimensional conjugation of stacked graphene sheets into nanoscale graphitic $sp^2$ domains surrounded by disordered, oxidized $sp^3$ domains as well as defects of carbon vacancies. Therefore, GO can readily be exfoliated to form stable, light-brown-colored, suspensions of single-layer sheets in water. FIG. 7A shows an AFM image of an exfoliated ~1 nm thick single layer of GO. As illustrated in FIG. 7B, GO sheets are derivatized by carboxylic acid at the edges, and phenol, hydroxyl and epoxide groups mainly within the basal plane. While the oxidation of the conjugated network renders GO sheets insulating, significant conductivity may be restored by thermal or chemical treatments (the chemical conversions are illustrated in FIG. 7C).

Figure 8A:
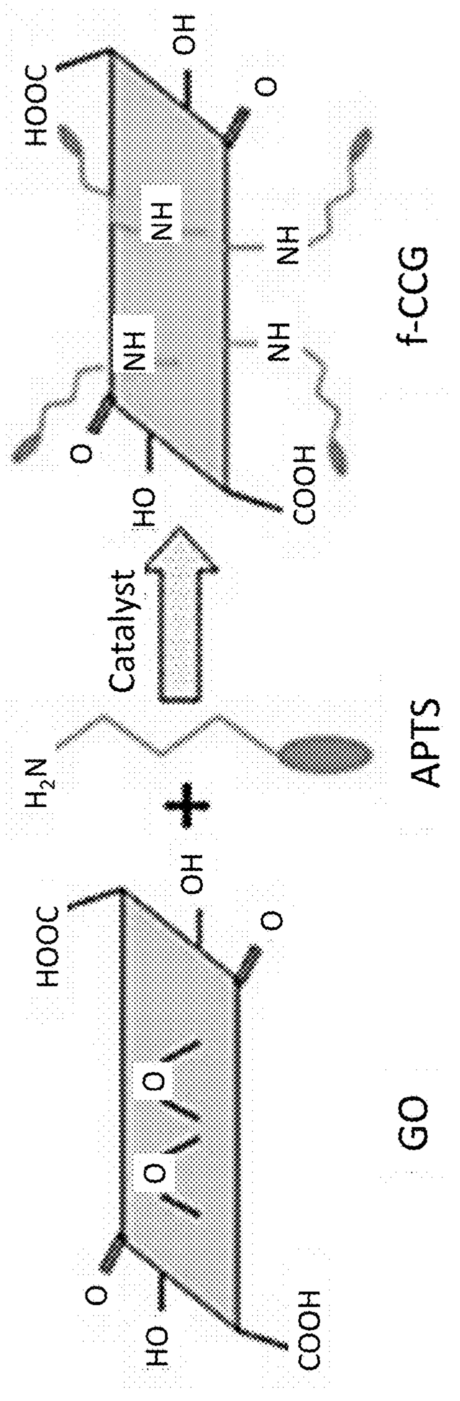
FIG. 8A: The covalent functionalization of GO epoxy groups with 3-aminopropyltriethoxysilane (APTS). (Image is reproduced from Yang, H., et al. *J. Mater. Chem.* 2009, 19, 4632-4638.)
Figure 8B:
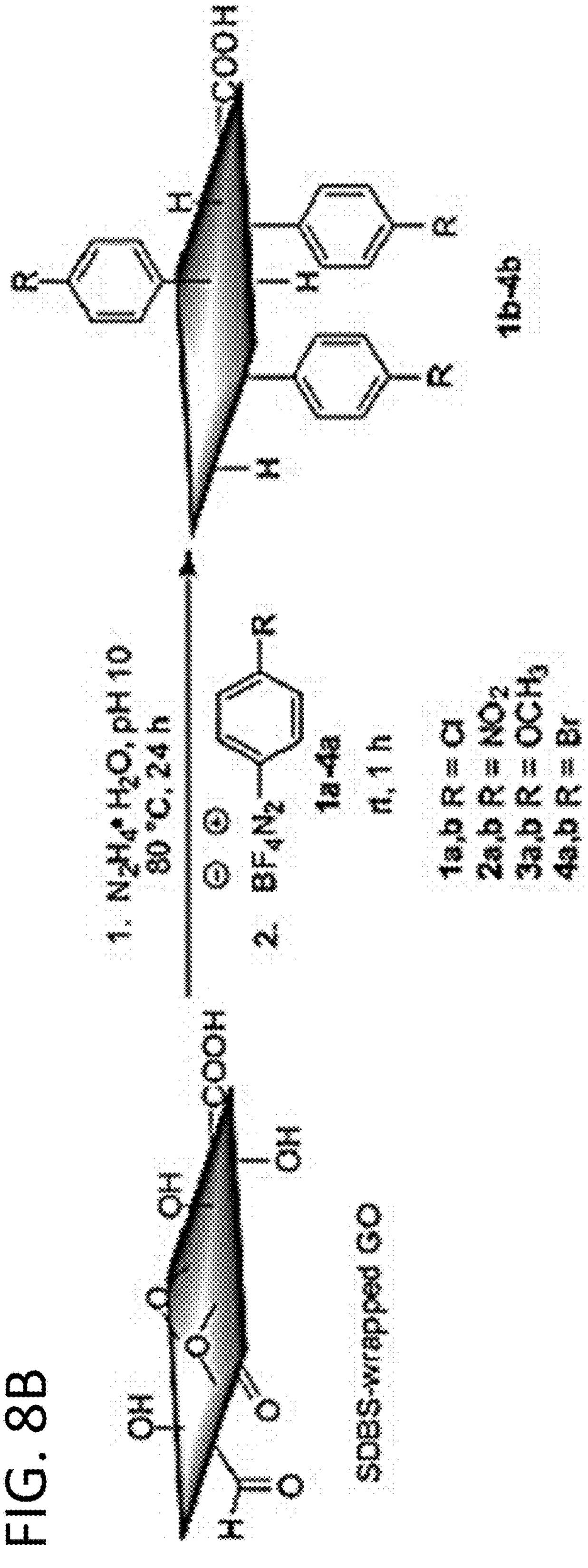
FIG. 8B: The covalent functionalization of reduced GO sheets with diazonium salts, starting from SDBS-wrapped GO (SDBS=sodium dodecyl benzene sulfonate, a surfactant). (Image is reproduced from Lomeda, J. R., et al. J. Am. Chem. Soc. 2008, 130, 16201-16206.)
Figure 8C:
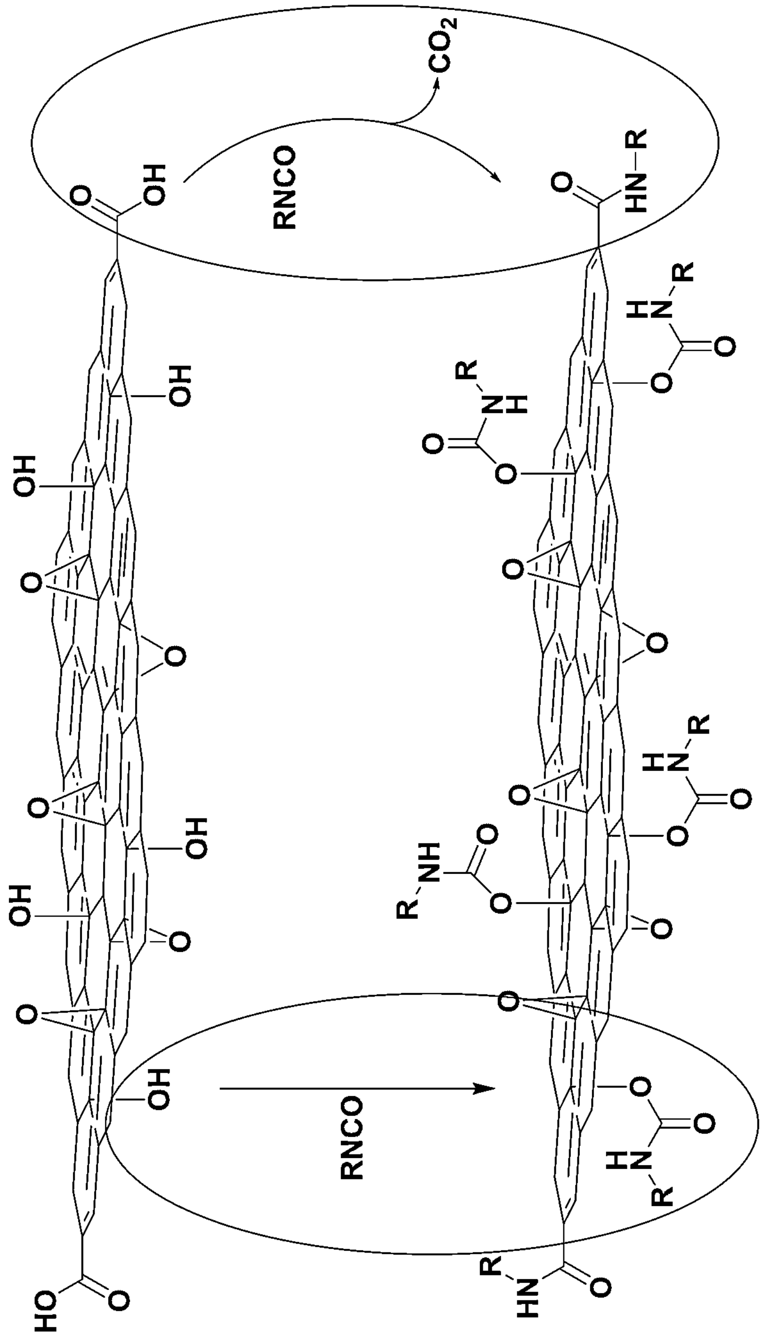
FIG. 8C: The covalent functionalization of GO carboxylic acid and hydroxyl groups via isocyanate treatment. (Image is reproduced from Stankovich, S., et al. *Carbon* 2006, 44, 3342-3347)

The oxidization-exfoliation-reduction cycle illustrated in FIGS. 7B-7C effectively makes insoluble graphite powders processable in water, enabling many ways of using conducting graphene or reduced GO (rGO) products. In addition, GO can readily be functionalized with a plethora of organic, inorganic, and biological functionalities, using chemistries that selectively react with either a particular basal-plane or edge functional groups, as illustrated in FIGS. 8A-8C, making them fully compatible with organic solvents as well as organic and biological polymers. The phrase "graphene-based materials" (GBMs) may be used to refer to GO, rGO, graphene, and combinations thereof. The phrase also includes such materials further functionalized as illustrated in FIGS. 8A-8C.

This Example describes the experiments conducted towards GBM formulations, specifically GO and rGO formulations, for incorporation into paper packaging to meet or exceed existing polymer-based packaging solutions. Specifically, GBM-based coating formulations in which the GO nanosheets have a range of oxygenate functionalities (represented macroscopically by their C/O ratios, and/or particle size dispersions) were synthesized and examined for their use to improve the barrier properties of paper-like substrates.

Experimental

Three sets of experiments were conducted to directly and indirectly evaluate water, oil, and vapor barrier transport properties of different types of GO coated paper substrates with different combinations of GO and a commercially available water-based barrier coating (WBBC) solution. The overarching goals of these experiments were to demonstrate efficacy of GO as a barrier material across a spectrum of liquids and gases, identify optimal concentrations, and gain insights into efficient, low-cost manufacturing processes.

Materials

The materials used in this study included: three different types of paper substrates, GO, and a commercial WBBC formulation. The GO was a 1 wt % aqueous dispersion manufactured by Merck. Diluted GO solutions were obtained from the as-supplied 1 wt % GO dispersion as described below. The WBBC formulation was a Joncryl HPB 1631-A material manufactured by BASF, which may be characterized as an aqueous emulsion of a styrene-acrylate copolymer (wt. average molecular weight ~200 KDa, 39 wt % non-volatiles, pH~9 at 25° C. as induced by ammonia additive, viscosity ~1250 cps at 25° C., density=1.02 g/cm$^3$ at 25° C.). As supplied, Joncryl HPB 1631-A is very viscous. Thus, diluted WBBC solutions were also obtained from the as-supplied Joncryl HPB 1631-A as described below. Henceforth, the term "WBBC" may be used to refer to the WBBC solutions and coatings formed from Joncryl HPB 1631-A.

The paper substrate types were brown recycled paper bags used by a large meal kit company and two different types of commercial food packaging grade paperboard manufactured by a Europe-based international paper manufacturer. One type of commercial food packaging grade paperboard had a water-based barrier coating thereon (distinct from that formed from the Joncryl HPB 1631-A-derived WBBC solution described above) (referred to as "Stock A" herein), while the other did not have this particular water-based barrier coating thereon (referred to as "Stock B" herein). During testing, it was determined that each face of the two different paperboard types (Stock A and Stock B) had different coatings thereon so that, in effect, they represented four different paper types. The different coatings on each face are referred to herein as "gloss" on one face and "matte" on the other face. With the recycled paper bags, then, there were five different paper substrates studied: recycled paper bags, Stock A gloss, Stock A matte, Stock B gloss, and Stock B matte.

Apparatus

The equipment used in this Example included a chemical fume hood, a manual cold roll laminator for applying barrier coating solutions, a Mettler Toledo AB-104 balance with 0.0001 g resolution, and a Thermo Scientific Heratherm OGS-100 general protocol oven.

Barrier Coating Formulation Preparation and Application

While a range of barrier coating formulations were tested in this Example, the formulation and application protocols were identical for each. First, an aqueous solution of the desired formulation was created by diluting the bulk coating material (the 1 wt % GO solution or the Joncryl HPB 1631-A). For example, a 0.1% GO solution was created by thoroughly mixing 1-part 1 wt % GO with 9-parts deionized water. (Thus, 0.1% GO means the coating solution contains 0.1 wt % GO in water, 0.2% GO means the coating solution contains 0.2 wt % GO in water, etc.) Similarly, a blend of 0.1% GO and 25% WBBC was created by mixing 1-part 1% GO, 2.5-parts Joncryl HPB 1631-A, and 6.5-parts deionized water. (Thus, a blend of 0.1% GO and 25% WBBC means the coating solution contains 0.1 wt % GO in water and 25 wt % Joncryl HPB 1631-A in water.)

Once prepared, an amount of the desired formulation was placed in a large sealable plastic bag. A single sheet of the desired paper substrate (e.g., brown recycled paper bags, Stock A paperboard, Stock B paperboard) were inserted into the bag. Air was removed from the bag so that the paper substrate was completely immersed in the coating solution. The coating solution was agitated by hand and the bag was turned over to ensure uniform coating for a total immersion time of 45 seconds. After immersion, the coated paper substrate was removed from the bag and run once through the cold roll laminator to remove excess coating solution. The coated paper substrate was then hung to dry from a 'clothesline' for ~2 h.

After air drying, the coated paper substrate was placed in the oven which had been preheated to a selected temperature. Up to eight coated paper substrates could be heated at a time. The coated paper substrates were heated for 10 minutes, removed from the oven, and allowed to cool. It should be noted that the heating time was selected to ensure that the entirety of the coated paper substrate would reach the set temperature. The actual heating time required may be minimal, virtually instantaneous.

Test Parameters

A wide range of GO and WBBC concentrations were tested with the linked objectives of understanding the parameter space and determining how little of each was necessary to provide desired barrier properties. GO concentrations tested were: 0% (i.e., the baseline without GO), 0.01%, 0.02%, 0.05%, 0.10%, 0.20%, 0.50%, and 1%. (These all refer to the weight % of GO therein.) Concentrations of WBBC tested were: 0%, 25%, and 50%. (These all refer to the wt % of Joncryl HPB 1631-A therein.) In addition, mixtures of GO and WBBC were made for every combination except 1% GO and 100% WBBC.

Note that control paper substrates were created based on immersion in deionized water for 45 seconds, dried, and heated. These represented the 0% GO/0% WBBC cases. This was done based on the understanding that immersing a paper substrate in liquid has the potential to change the structure and properties of that paper substrate. As such, to better understand the effects of GO and WBBC on the different types of paper substrates being studied, it was important to have a baseline that had been subjected to the same preparatory conditions. From an industrial application perspective, however, it is of course important to compare the results against the performance of the commercially available paper substrate (i.e., not immersed in water, dried, and heated). Thus, both comparisons were made.

Five different heating temperatures were studied: ~20° C. (room temperature), 80° C., 100° C., 120° C., and 160° C. The highest temperature was chosen based on data indicating that this was the temperature at which the thermochemical reaction would occur during which the coated paper would transition from being hydrophilic to hydrophobic (i.e., see the reduction illustrated in FIG. 7B to FIG. 7C.) In practice, the highest temperature may be too high as it may interfere with other desired properties of the paper substrate. Consequently, a range of temperatures was examined to determine if the paper substrate would achieve barrier performance, specifically hydrophobicity, at acceptable temperatures.

Water Absorption Measurement Protocol

Experiments were conducted to quantify changes in water absorption as a function of different barrier coating concentrations and temperatures. To standardize the measurements, 5.08 cm×6.35 cm (2"×21/2") swatches were cut from prepared samples. A ~4.25 cm diameter circle was traced in crayon on each swatch; this served as a hydrophobic dam to contain water within the defined circle. Each swatch was then weighed using the Mettler Toledo AB104 electronic balance. The dry weight of the paper that would be wetted was the weight of the swatch multiplied by the ratio of the area of the circle and the area of the paper. This would be the reference dry paper weight for that swatch.

Using a syringe, 3 mL of deionized water was placed in the circular region on each swatch. Where possible, the water was spread around to fill the entire area of the circle. Note that this was not always possible for the highly hydrophobic cases; the wetted area would at least initially be smaller than the circle. However, to maintain uniformity, it was decided to keep the amount of applied water constant throughout the experiment for all conditions. (For the less hydrophobic cases, more than 3 mL of water would overflow the circle.)

Every 10 minutes, the water was removed using a syringe. Excess remaining water was blotted off with paper towels so that there was no unabsorbed water on the surface of the swatch. The swatch was then weighed, and 3 mL of clean deionized water was again added. This process was repeated six times for a total of one hour.

The weight of the water absorbed at any time, t, was simply the difference between the weight of the blotted swatch at that time minus the original dry weight of the swatch at t=0 before water was applied. The absorbed water weight to dry paper weight was then the ratio of the absorbed water weight divided by the reference dry paper weight defined above. For data shown in this Example, the average of five swatches from the same sample were used. The rms for these individual measurements were calculated to quantify uncertainty.

The advantage of these experiments is that it was possible to examine differences as a function of the side of the paper substrate. That is, as shown below, there were distinct differences depending on which side of the paper substrate the water was applied. This was particularly true for both types of commercial food packaging grade paperboard. This was not apparent for the recycled grocery paper bag, possibly because it was too porous and thin for there to be any noticeable side-to-side variation.

Produce Freshness Testing

A produce freshness test was developed to test gas barrier properties of the coated paper substrates. The rationale underlying the test is that noticeably longer shelf life is a direct indicator of improved gas-barrier properties. From a practical perspective, longer shelf life is arguably the most important indicator of whether or not GO can serve as an effective food packaging material.

To conduct this test, envelopes were constructed using full sized sheets of the coated paper substrates. The dimensions of the envelopes made from the paperboard samples (Stock A and Stock B) and recycled paper bags were approximately 15 cm×21 cm and 14.6 cm×27 cm, respectively. Every envelope had a 10 cm×15 cm window cut out which was covered with clear plastic film. Each envelope was sealed with clear packaging tape.

Prior to sealing, a single leaf (with stalk) of baby bok choy and a cherry tomato was placed in each envelope. As a baseline, a baby bok choy leaf and cherry tomato was placed and sealed in a plastic food storage bag. The produce was placed in the envelopes the day following purchase. This was referred to as Day 1. For the first two days of the experiment, i.e., Days 2 and 3, the envelopes were placed in a refrigerator. After that, in an attempt to accelerate the experiment, the envelopes were stored in a room out of direct sunlight that was maintained at ~22° C. All of the envelopes were spread out on a shelf for the duration of the experiment so that they would not be touched or moved. They were photographed daily with care taken to maintain constant lighting conditions.

Results and Discussion

Water absorption and produce freshness tests were conducted with and without barrier coating formulations over a range of GO concentrations from 0% to 1% by solution weight and Joncryl HPB 1631-A, a commercially available WBBC, concentrations from 0% to 50% of the manufactured solution strength. Additional testing to evaluate heating temperatures was conducted. Representative data are presented in this section.

Notes on Heating Temperature

As noted below, four different heating temperatures were examined. It was hypothesized that heat-treating GO-coated paper substrates at a higher temperature may increase hydrophobic effects because increasing the heating temperature tunes the C/O ratio of the GO nanosheet upward. For example, in Compton, O. C., et al., *ACS Nano* 2011, 5, 4380-4391, it was shown that annealing GO sheets with an initial 1.7 C/O ratio in organic solutions over a small temperature range between 150-200° C. increase C/O to between 2.7 and 4.4. By heating a GO sheet on a hydrophilic carbohydrate-based fiber substrate (i.e., a paper substrate), where there is no solvation stabilization by the organic solvent, highly desirable differentiated surface properties will be achieved as the oxygenated functional groups on the "air-exposed" side of the GO nanosheet will be preferentially eliminated as compared to those on the side in contact with the underlying paper substrate. It was thus hypothesized that the "air-exposed" side will become more hydrophobic during heat treatment while covalent ether linkages will form between the paper substrate and the side in contact with the paper substrate, via either dehydration reactions or by the ring-opening of the GO epoxy groups by the hydroxyl groups on the carbohydrate fibers of the paper substrate. This in turn will lead to tighter binding of the GO sheets to the paper substrates and reduce the possibility of transference onto foods and drinks during subsequent usage in packaging.

It was therefore a surprising result that enhanced hydrophobicity was observed even without heating the coated paper substrates, i.e., at room temperature. Further, there did not appear to be a strong temperature dependence across the entire temperature range examined, ~20° C.-160° C. However, in formulations combining GO and Joncryl HPB 1631-A, it was observed that the GO appeared to run off the paper substrate surface if the samples were not heated. As such, it was determined that some heating was desirable to chemically bond the GO to the paper substrate, the WBBC, or both.

It was also observed that at 160° C., there was some degree of burning of the paper, as evidenced by a strong odor during heating. Thus, it was decided to focus on a heating temperature of 100° C. The rationale was that this would provide sufficient heating to chemically bond GO to the paper substrate without damaging/burning the paper substrate. Data presented in this Example are all from samples heated at 100° C.

Water Absorption Measurements

Figure 3:
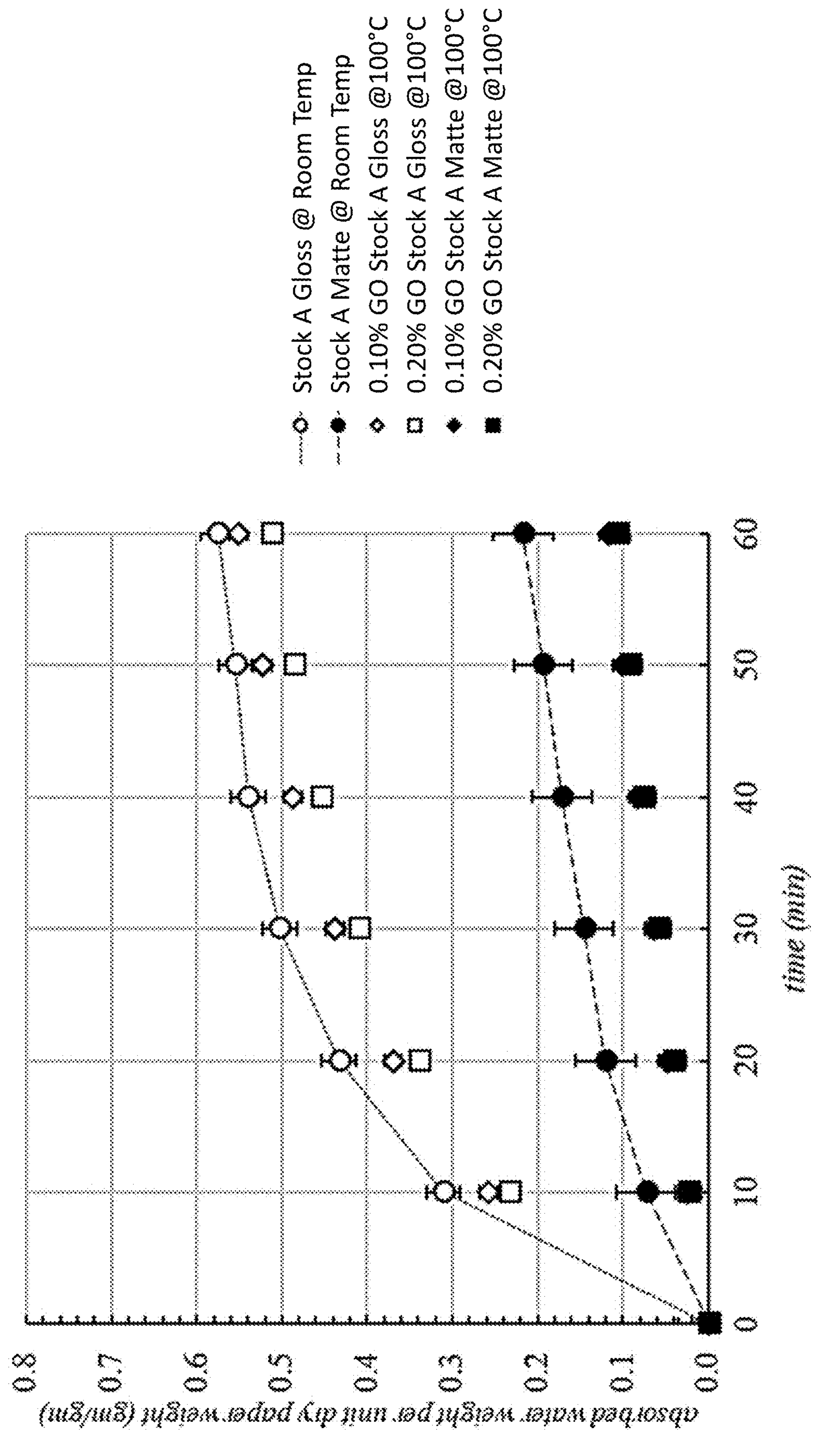
FIG. 3: Plot of non-dimensional water absorption as a function of applied GO for a commercial food-packaging-grade paperboard having a built-in water-based barrier coating thereon (Stock A). The term “non-dimensional” is used since the weight of the water absorbed is divided by the initial dry weight of the paper substrate being wetted. Open and closed symbols indicate measurements made on the gloss and matte sides, respectively, of the Stock A paper substrate.
Figure 4:
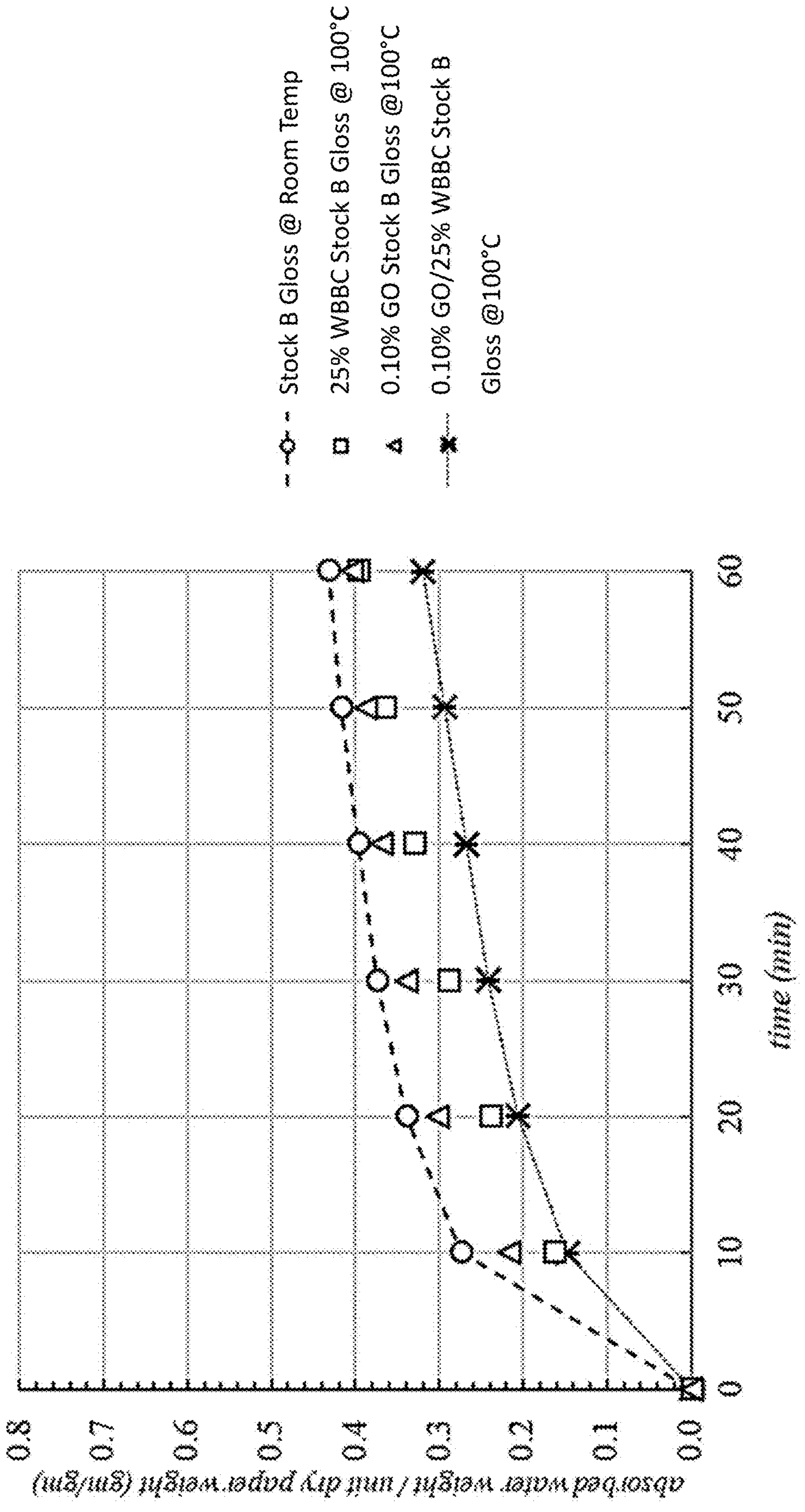
FIG. 4: Plot of non-dimensional water absorption for a commercial food-packaging-grade paperboard not having a built-in water-based barrier coating thereon (Stock B). The measurements were made on the gloss side of the Stock B paper substrate.
Figure 5:
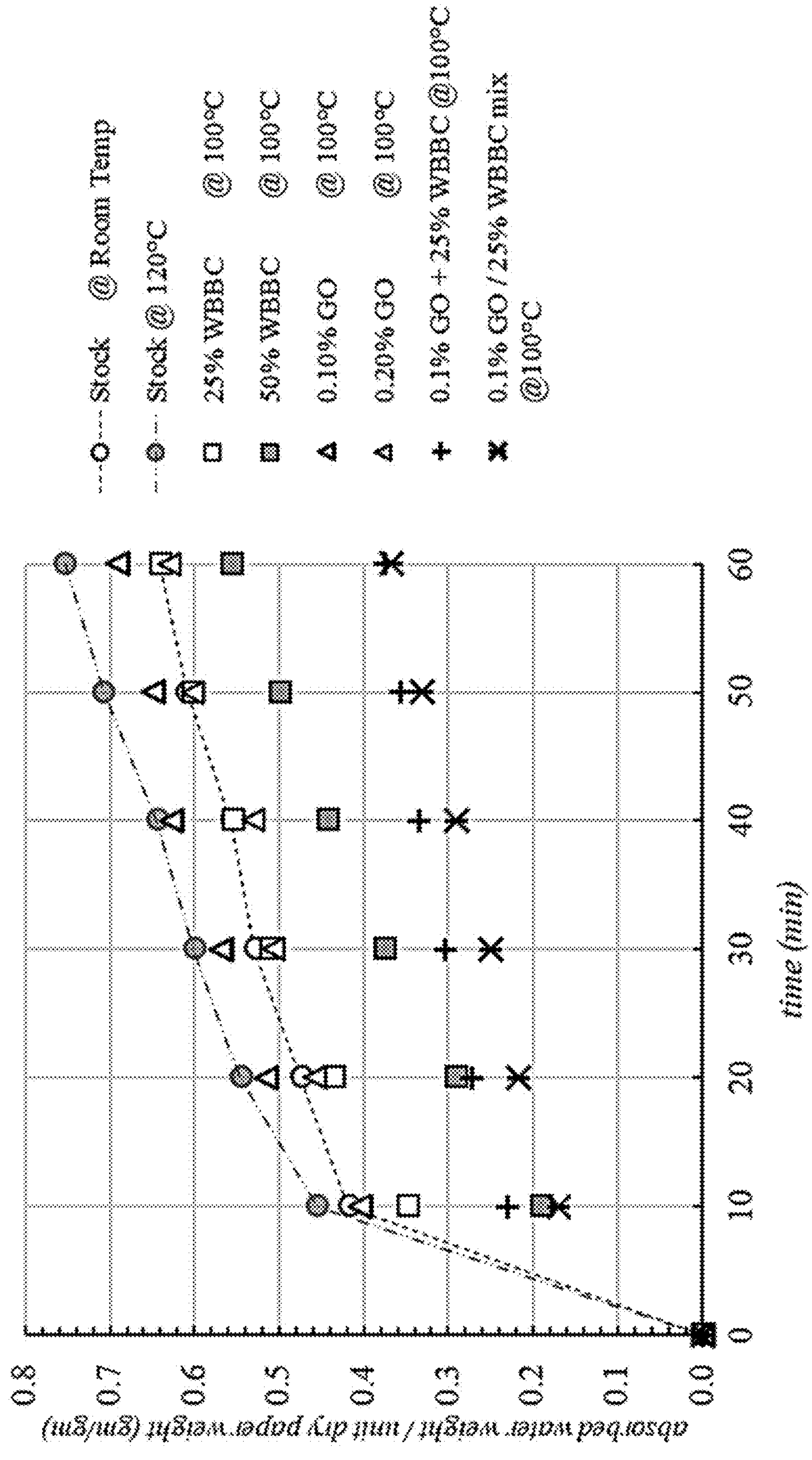
FIG. 5: Plot of non-dimensional water absorption for a brown grocery paper bag made from recycled paper stock. The open circles represent untreated recycled paper bag (no GO or WBBC applied) while the closed circles represent untreated recycled paper bag (no GO or WBBC applied), but the paper bag was immersed in deionized water and dried at 120° C. This increases water absorption compared to the untreated open circles. It is also notable that there is a significant improvement in barrier protection when using both GO and WBBC.
Figure 6:
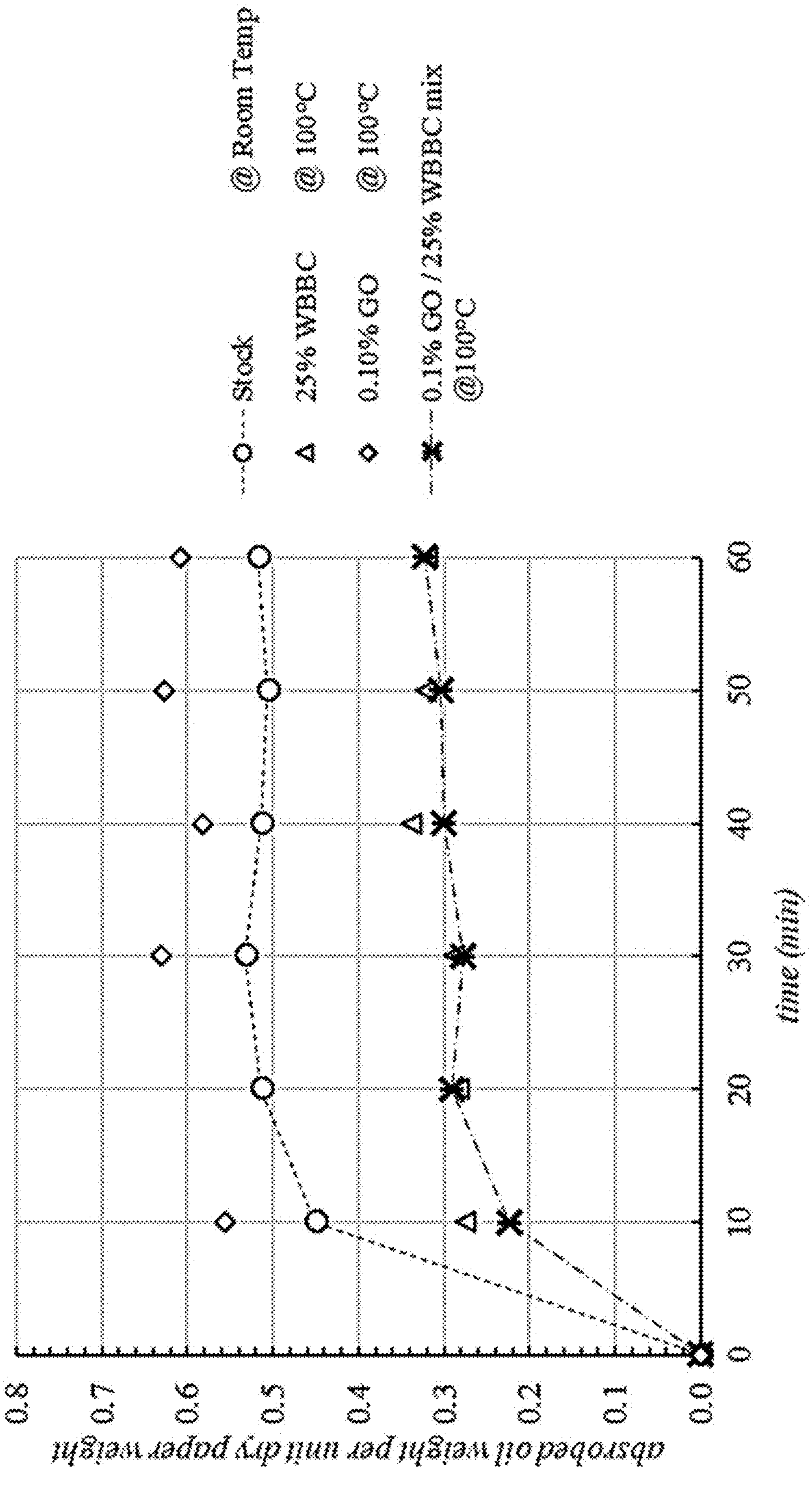
FIG. 6: Plot of non-dimensional oil absorption for untreated and treated recycled grocery paper bag.

Plots of water absorption as a function time are shown in FIGS. 3-5. In all three plots, the ordinate is the average weight of water absorbed within the 4.25 cm diameter circle non-dimensionalized by the original dry weight of a 4.25 cm diameter circle of the test swatch. The abscissa is time measured in minutes. As noted earlier, data presented in these figures are the average of five independent measurements. In FIG. 3, error bars are included to provide a sense of the degree of uncertainty. Where no error bars are visible in that plot, the bars exist, but are smaller than the plotter symbol. It can be seen that while still small, the more absorbent paper substrates had higher uncertainties.

Water absorption data for the Stock A paper substrate (the commercial food packaging grade paperboard having a water-based barrier coating thereon (distinct from that formed from the Joncryl HPB 1631-A-derived WBBC solution described above)) are shown in FIG. 3. In this plot, open circles represent the gloss side of the Stock A paper substrate, closed circles represent the matte side of the Stock A paper substrate, both which were not treated with any GO or WBBC. Similarly, open diamonds and open squares represent the gloss side of the Stock A paper substrate treated with 0.1% GO and 0.2% GO, respectively. Closed diamonds and closed squares represent the matte side of the Stock A paper substrate treated with 0.1% GO and 0.2% GO, respectively. Dotted lines were added to help easily identify the reference paper substrates.

There are three observations that can be made. First, clearly there were differences in absorption depending on which side of the paper water was applied. Second and more importantly, irrespective of which side of the paper tested, applying GO reduces the amount of water absorbed by the paper at each time tested. That is, GO improves water barrier properties. Finally, while more GO led to improved water barrier protection, the improvement was not linear with concentration. This was most noticeable for the matte data, shown with solid symbols. As such, there is an optimization between the amount of GO used to achieve a certain amount of barrier improvement and the cost of the GO.

It is noteworthy that GO concentrations as low as 0.02% decrease water absorption. This is a fundamentally different approach than prior studies in which the amount of GO added to the paper was up to 15% by weight of the substrate. In the present work, the amount of GO added was immeasurably small, i.e., less than 0.1% of the weight of the swatches.

The ability to achieve hydrophobicity at such low concentrations of GO supports the hypothesis that the hydroxyl and epoxy groups on the basal plane of the GO nanosheets, as well as the carboxylate groups at their edges, interact with the hydroxyl groups on the surface of the paper substrate fibers, through array of hydrogen-bonding interactions during the coating process, resulting in a combination of wrapping and covering at least some of these fibers. (The hydroxyl groups on the paper substrates include those present in the carbohydrate polymers that make up the cellulose fibers of the paper substrate as well as fillers that may be incorporated into the paper substrate during manufacturing.) The coated areas of the paper substrate fibers thus become overall more hydrophobic as the C/O ratio at those areas will now be above the initial C/O of the carbohydrate polymers that making up the cellulose fibers, creating a spotty more-hydrophobic pattern that renders the overall surface of the paperboard more resistant to the external water without the need for full coverage, similar to the macroscopic superhydrophobic effect of the textured surface of the lotus leaf.

Having demonstrated that GO increases the hydrophobicity of the paper substrates at concentrations far lower than those used in existing applications, the next step was to examine how GO interacts with the WBBC solutions. The results are shown in FIG. 4. For this experiment, the Stock B paper substrate was used.

In this plot, open circles represent the gloss side of the Stock B paper substrate which was not treated with any GO or WBBC. A dashed line has been included to highlight the baseline. Open squares represent the gloss side of the Stock B paper substrate treated with 25% WBBC. Open triangles represent the gloss side of the Stock B paper substrate treated with 0.1% GO. The “x” s represent the gloss side of the Stock B paper substrate treated with a blend of 0.1% GO and 25% WBBC.

The key finding in FIG. 4 is the fact that the coating based on a blend of GO and WBBC significantly outperforms both the coating based on GO alone and the coating based on WBBC alone. A line connecting data points from the mixture has been added to illustrate this result. As the key component of the WBBC solution is a water-soluble polymer (the styrene-acrylate copolymer), it is hypothesized that the added GO nanosheets may significantly interact with the copolymer as well as with the carbohydrate polymers that make up the cellulose fibers of the paper substrate as described above. The result is a complex but synergistic network of interactions between the three components, leading to enhanced barrier properties.

There are two additional points of interest which can be seen in FIG. 5, showing eight different samples based on the recycled brown grocery paper bag. In this plot, the open circles represent untreated recycled paper bag (no GO or WBBC was applied). Closed circles also represent untreated recycled paper bag (no GO or WBBC was applied), but the recycled paper bag was immersed in deionized water and dried at 120° C. The open squares represent recycled paper treated with 25% WBBC. The closed squares represent recycled paper bag treated with 50% WBBC. The open, bold triangles represent recycled paper bag treated with 0.1% GO. The open, unbold triangles represent recycled paper bag treated with 0.2% GO. The “+”s represent recycled paper bag treated sequentially, first with 0.1% GO, next with 25% WBBC. The “x” s represent recycled paper bag treated with a mixture containing both 0.1% GO and 25% WBBC.

The reason for treating the paper substrate with deionized water is evident from FIG. 5. As noted above, data from the paper substrates with neither GO nor WBBC are plotted with circles. Data from the paper substrates with GO only and WBBC only appear as triangles and squares, respectively. Data from the paper substrates with both GO and WBBC are shown with ‘+’ and ‘x’ symbols. It can be seen that 0.2% GO provides more water barrier protection than 0.1% GO. The same is true for 50% WBBC in comparison to 25% WBBC. These results are consistent with the findings from tests on paperboard substrates (FIG. 4).

The interesting finding was that, in comparison to the baseline, the untreated recycled paper bag, shown as open circles in FIG. 5, the 0.1% GO case appeared to be worse than the baseline, and the 0.2% GO case only marginally better in the first ~30 minutes. This led to the test involving ‘applying’ only deionized water to the paper (closed circles). The hypothesis was that for the less dense, shorter fiber untreated recycled paper bag substrate, immersing it in water for 45 seconds and then heating it might significantly alter the structure of the paper substrate. Although a commercially relevant comparison is the effect of GO/WBBC as compared to completely untreated paper substrates (open circles), the scientifically relevant comparison involves exposing the untreated paper substrate to the same steps as the treated paper substrates (immersion in water and heating) except for application of GO and WBBC.

As can be seen in FIG. 5, the hypothesis that the paper substrate was significantly affected by the initial immersion in deionized water was correct. The closed circles show the absorption measurements after the untreated recycled paper bag was immersed in deionized water and heated. There was a significant increase in water absorption in comparison to the untreated recycled paper bag that was not immersed in water and heated (open circles). Thus, when the 0.1% GO and 0.2% GO data (bold and unbold triangles) are compared to the 0% GO data (closed circles), the trends initially seen in FIG. 4 are confirmed.

More importantly, the results of FIG. 5 show that a combination of GO and WBBC greatly outperforms either GO-only or WBBC-only for recycled paper bags, a very different type of paper substrate as compared to the paperboard substrates of FIGS. 3 and 4. In fact, for the recycled paper bags, the GO-WBBC combination reduced the amount of water absorption by almost 50% in comparison to the untreated recycled paper bags (open circles). What is most interesting, however, is that premixing GO and WBBC ('x' symbols) appeared to provide better water barrier protection than the two-stage, sequential application process ('+' symbols). Both treatments, however, greatly reduce water absorption so the choice of whether to premix or apply sequentially can be made in view of other considerations such as ease and manufacturing costs.

Finally, in comparing the combined GO-WBBC formulations shown in FIGS. 4 and 5 (the 'x' symbols), it is observed that the net water absorption per unit dry weight of test paper was approximately equal for both recycled grocery bag paper and the much heavier grade paperboard.

Produce Freshness Experiments

Visual data (photographs) from produce freshness testing were obtained (data not shown) using both types of commercial food grade paperboard as well as the recycled paper bag material. The protocol for these experiments were described above. Since the photographs were taken by hand using a camera phone, when assembling the collages comprising each figure, every attempt was made to scale the photos so that everything in each photograph had the same scale. Care was taken during photographing to make sure that the lighting was constant, so no other image processing was done other than making sure that the scales in each collage were constant.

Photographs were taken of stored baby bok choy leaves and cherry tomatoes stored in envelopes (or a plastic food storage bag) at room temperature on five different days of testing, Days 4, 6, 8, 10, and 12. Recall that beginning Day 3, the envelopes were stored at a constant room temperature without direct sunlight or refrigeration. It was interesting to note that the cherry tomatoes lasted much longer than the baby bok choy, showing no signs of discoloration, wrinkling of the skin, or loss of firmness for all samples for quite some time after the bok choy had clearly spoiled. As such, no comment will be made about the shelf life of the tomatoes.

As noted above, baseline data was obtained from the produce was stored in a sealed plastic food storage bag. Prior to sealing, excess air was removed from the bag, but it was not vacuum-sealed. A first set of data was obtained from produce placed in an envelope made from commercial food-packaging-grade paperboard having the built-in water-based barrier coating thereon (Stock A). A second set of data was obtained from Stock A treated with 0.1% GO. A third set of data was obtained from commercial food-packaging-grade paperboard not having a built-in water-based barrier coating thereon (Stock B) treated with a mixture of 0.1% GO and 25% WBBC.

Careful examination of the baseline data revealed clear signs of yellowing at the left and bottom edges of the bok choy leaf (relative to the image orientation) on Day 8, which is even more pronounced on Day 10. Very faint indications of yellowing were seen on Day 6. But certainly, by Day 12, the leaf significantly yellowed and would be removed and discarded.

The first set of data (untreated Stock A) showed evidence that the spoilage process was inhibited and extended shelf life. Some yellowing is observed on Day 8 but the bok choy leaf is preserved longer than in the baseline data. However, it should also be noted that some degree of leaf shrinkage was observed in the untreated Stock A envelope relative to the baseline plastic bag. This is likely due to evaporation from the leaf which is lost through the envelope walls. Since the plastic bag has minimal water-vapor transportability, water loss, i.e., shrinking, is not an issue. However, the buildup of spoilage chemicals which also cannot cross the plastic barrier changes the nature of the spoilage process in comparison to the paper-based envelopes.

The second set of data (0.1%-GO-treated Stock A) shows that shelf-life is further extended. Specifically, spotting of the leaf is delayed until Day 10 or 12 although the leaf does not have the same rich dark green color on Day 12 as it does on Day 4. Shrinkage of the leaf is also observed from Day 4 to Day 12.

The greatest degree of shelf-life extension was achieved from the third set of data (GO-WBBC-treated Stock B). The leaf on Day 12 looks almost as green as it did on Day 4. Additionally, the degree of shrinkage of the leaf is far less than for the other two cases.

Arguably, extending shelf-life of produce is a direct indicator of reduced gas transport across the packaging material, especially water vapor transport. As can be seen from the baseline data, zero gas transport is not necessarily the goal. The amount of allowable gas transport will actually depend on the type of gas. Ethylene, an example chemical associated with ripening/spoilage, is both a ripening/spoilage byproduct chemical as well as a ripening/spoilage signal. As it builds up, ripening/spoilage accelerates. Consequently, high ethylene gas passage through the packaging is desired. A loss of water vapor resulting in a drying out of the produce, on the other hand, is undesirable.

The ability to maintain freshness across different types of paper substrates was demonstrated by repeating the food freshness testing as outlined above but with the recycled paper bag material (data not shown). This paper is a much-lighter-weight paper substrate with shorter, recycled fibers, likely less fillers, and therefore much less dense than the high-quality paperboard substrates (Stock A and Stock B). A baseline set of data was obtained from a bok choy leaf and cherry tomato placed in an envelope made of an untreated recycled grocery paper bag. Another set of data was obtained from the recycled grocery paper bag treated with the mixture of 0.1% GO and 25% WBBC.

The contrast between the untreated paper substrate and GO-WBBC treated paper substrate was marked. The lack of gas-barrier protection of the untreated paper substrate led to rapid spoilage and dehydration of the bok choy leaf. In contrast, the bok choy leaf in the GO-WBBC treated paper substrate appeared to do as well as the untreated Stock A (first set of data described above).

Oil/Grease Barrier Properties

The ability of GO to act as an oil/grease barrier was tested in two different ways. In one experiment, a drop of olive oil was placed on a piece of untreated recycled grocery paper bag. Another drop was placed on a piece of recycled grocery paper bag that had been treated with the 0.1 wt % GO~25 wt % WBBC blend. Photographs of the oil drops were taken 5, 10, and 30 minutes after they had been placed (data not shown). The degree to which the treated paper substrate is protected from oil penetration was unmistakable-almost no spreading of the oil droplet occurred after 30 minutes on the treated paper substrate versus more than a 100% increase in size of the oil droplet after 30 minutes on the untreated paper substrate.

To explore this further, a smaller scale oil absorption test was conducted using the recycled grocery paper bag and an absorption measurement protocol similar to that used for water absorption. The principal differences were that: i) the swatch sizes were 5.08 cm squares, ii) an ~0.1 cm lip was folded up around the perimeter of each swatch and the entire swatch was wetted (as opposed to the 4.25 cm circle used for the water absorption experiments), iii) 2 mL of oil was applied instead of 3 mL, and iv) only one swatch of each treatment type was tested.

Similar to the testing shown in FIG. 4, for this experiment, samples of untreated paper substrates (no GO or WBBC applied) (open circles), treated paper substrates with either 0.1% GO applied (open diamonds), 25% WBBC applied (open triangles), or a mixture of 0.1% GO and 25% WBBC applied ("x" symbols) were tested. The results are shown in FIG. 6, with lines to highlight the untreated sample and the GO-WBBC treated sample. As with the water-absorption experiments, the GO-WBBC blend reduced the amount of oil absorbed per unit dry paper weight by 40-50% over a period of an hour.

Finally, a comment on the fact that the 0.1%-GO-treated sample absorbed more oil than the reference untreated sample is provided. This effect is believed to be similar to that observed from the water-absorption data shown in FIG. 5, where it was demonstrated that properly subjecting the "untreated" paper substrate to water immersion and heating changed the baseline reference from the open circles to the closed circles. A similar effect is likely to be observed for the oil-absorption data so that the apparent increase in oil absorption (reduced oleophobicity) observed for the 0.1% GO treated sample would disappear if compared to the "untreated" sample subjected to water immersion and heating, analogous to the results shown in FIG. 5.

CONCLUSIONS

This Example has demonstrated the following: i) GO significantly improves water-barrier performance when applied to paper substrates as evidenced by water-absorption experiments, based on analysis of chemical bonding between GO and the fibers in the paper substrates, and the fact that very different types of paper substrates were examined; ii) This improvement is not limited to paper substrates, but generally applies to textiles or other networks including natural and synthetic fibers; iii) The combination of WBBC and GO provides better water-barrier performance than either WBBC or GO alone; iv) GO significantly improves gas-barrier performance when applied to paper substrates as evidenced by produce shelf-life experiments; v) the combination of WBBC and GO significantly improves oil/grease-barrier performance when applied to paper substrates based on oil-droplet and oil-absorption experiments; vi) GO alone increases oil/grease barrier performance (data not shown).

Applications for the formulations synthesized in this Example include, but are not limited to, the following: replacing plastic and PFAS to extend freshness and shelf-life of fresh produce packaging; replacing plastic and PFAS to extend freshness and shelf-life of meat packaging; replacing PFAS lining of pastry wrappers; replacing plastic, PFAS, and wax in disposable tableware, i.e., plates, cups and straws; extending shelf-life of frozen foods by inhibiting vapor transport and reducing freezer burn; ensuring hydrophobicity of paper bottles; replacing PFAS as the waterproofing layer in textiles.

The following observations were noted: i) that significant barrier properties are achieved with GO amounts orders of magnitude less than those used in existing applications indicates a different mechanism is responsible for the improved properties; ii) immersing paper substrates in water, drying, and heating changes the original paper substrate structure and reduces water barrier properties; iii) the combination of WBBC and GO produced the same water absorption per unit dry paper weight for both recycled brown grocery paper bag and the heavier commercial food grade paperboard without a built-in water-based barrier coating (Stock B); iv) the fact that GO enhances barrier performance across water, oil/grease, and gases was surprising; v) the fact that there was such a marked increase in produce shelf-life was surprising; vi) the fact that it is possible to achieve significant barrier protection with at such low amounts (25%-50%) of a commercially available water-based barrier coating, Joncryl HPB 1631-A is when mixed with such small amounts of GO was surprising.

Additional information and experimental data may be found in U.S. provisional patent application No. 63/422,613, filed Nov. 4, 2022, the entire contents of which are incorporated herein by reference.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described to explain the principles of the disclosure and; as practical applications of the disclosure, to enable one skilled in the art to utilize the disclosure in various embodiments and with various modifications as suited to the particular use contemplated. It is intended that the scope of the disclosure be defined by the claims appended hereto and their equivalents.

What is claimed is:

1. A food-packaging material comprising a paper substrate having a surface and a coating comprising exfoliated graphene oxide on the surface of the substrate, wherein the exfoliated graphene oxide is present at an amount of less than 1 wt %, wherein the exfoliated graphene oxide comprises a plurality of individual sheets heterogeneously dispersed across the surface of the substrate such that the coating is non-continuous.

2. The food-packaging material of claim 1, wherein each sheet has a thickness of less than 2 nm.

3. The food-packaging material of claim 1, wherein at least some of the graphene oxide of the exfoliated graphene oxide is reduced graphene oxide.

4. The food-packaging material of claim 1, wherein the graphene oxide of the exfoliated graphene oxide exhibits a carbon-to-oxygen ratio in a range of from 1 to 5.

5. The food-packaging material of claim 1, wherein the exfoliated graphene oxide is present at an amount of 0.1 wt % or less.

6. The food-packaging material of claim 1, wherein the paper substrate is in a form of a porous network of cellulose fibers, wherein the graphene oxide of the exfoliated graphene oxide is covalently bound to individual cellulose fibers of the porous network.

7. The food-packaging material of claim 6, wherein the graphene oxide of the exfoliated graphene oxide is not present within pores of the porous network.

8. The food-packing material of claim 1, wherein the coating further comprises a water-soluble polymer.

9. The food-packaging material of claim 8, wherein the water-soluble polymer is a styrene-acrylate copolymer.

10. The food-packaging material of claim 8, wherein the exfoliated graphene oxide is present at an amount of 0.1 wt % or less and the water-soluble polymer is present at an amount of 25 wt % or less.

11. The food-packaging material of claim 8, wherein at least some of the exfoliated graphene oxide is covalently bound to the water-soluble polymer.

12. The food-packaging material of claim 1, wherein the food-packaging material consists of the paper substrate and the coating; and the coating consists of the exfoliated graphene oxide and optionally, a water-soluble polymer.

13. The food-packaging material of claim 1, wherein each sheet has a thickness of less than 2 nm; at least some of the graphene oxide of the exfoliated graphene oxide is reduced graphene oxide; and the paper substrate is in a form of a porous network of cellulose fibers, wherein the graphene oxide of the exfoliated graphene oxide is covalently bound to individual cellulose fibers of the porous network.

14. The food-packaging material of claim 13, wherein the exfoliated graphene oxide is present at an amount of 0.1 wt % or less and the coating further comprises a water-soluble polymer that is present at an amount of 25 wt % or less.

15. The food-packaging material of claim 14, consisting of the paper substrate and the coating and the coating consists of the exfoliated graphene oxide and the water-soluble polymer.

16. The food-packaging material of claim 15, wherein the water-soluble polymer is a styrene-acrylate copolymer.

17. The food-packaging material of claim 16, wherein the graphene oxide of the exfoliated graphene oxide is not present within pores of the porous network.

18. The food-packaging material of claim 1, wherein the paper substrate is in a form of a porous network of cellulose fibers, wherein the graphene oxide of the exfoliated graphene oxide is covalently bound to individual cellulose fibers of the porous network and the graphene oxide of the exfoliated graphene oxide is not present within pores of the porous network; further wherein the coating further comprises a styrene-acrylate copolymer; and further wherein the exfoliated graphene oxide is present at an amount of 0.1 wt % or less and the styrene-acrylate copolymer is present at an amount of 25 wt % or less.

19. The food-packing material of claim 1, wherein the coating further comprises a polymer along with the exfoliated graphene oxide and wherein any functional groups on the exfoliated graphene oxide are selected from the group consisting of epoxy groups, hydroxyl groups, carbonyl groups, carboxyl groups, and combinations thereof.

20. The food-packaging material of claim 19, wherein the exfoliated graphene oxide is present at an amount of 0.05 wt % or less.

21. A food-packaging material comprising a paper substrate having a surface and a coating comprising exfoliated graphene oxide on the surface of the substrate, wherein the exfoliated graphene oxide is present at an amount of less than 0.05 wt %, wherein the food-packaging material is free of a starch, a polymer, and an antimicrobial agent.

22. The food-packaging material of claim 21, wherein any functional groups on the exfoliated graphene oxide are selected from the group consisting of epoxy groups, hydroxyl groups, carbonyl groups, carboxyl groups, and combinations thereof.

* * * * *